United States Patent
Vedder

[11] Patent Number: 6,154,447
[45] Date of Patent: Nov. 28, 2000

[54] METHODS AND APPARATUS FOR DETECTING AND LOCATING CABLE FAILURE IN COMMUNICATION SYSTEMS

[75] Inventor: Mark Vedder, Manalapan, N.J.

[73] Assignee: AT&T Corp., New York, N.Y.

[21] Appl. No.: 08/926,604

[22] Filed: Sep. 10, 1997

[51] Int. Cl.$^7$ .............................. G01R 31/08; H04M 1/24
[52] U.S. Cl. ........................ 370/244; 370/242; 370/248; 379/26
[58] Field of Search ..................................... 370/242, 244, 370/248, 250, 251; 375/226; 379/2, 6, 8, 24, 26, 27; 714/25; 324/605, 628

[56] References Cited

U.S. PATENT DOCUMENTS

| | | | |
|---|---|---|---|
| 4,220,833 | 9/1980 | Wert et al. | 370/243 |
| 4,251,766 | 2/1981 | Souillard | 324/521 |
| 4,413,229 | 11/1983 | Grant | 324/52 |
| 4,524,321 | 6/1985 | Grant et al. | 324/66 |
| 4,870,675 | 9/1989 | Fuller et al. | 379/5 |
| 4,896,114 | 1/1990 | Donner | 324/522 |
| 4,928,134 | 5/1990 | Olver | 330/2 |
| 5,049,815 | 9/1991 | Kliman | 324/772 |
| 5,282,237 | 1/1994 | Babu et al. | 379/2 |
| 5,367,395 | 11/1994 | Yajima et al. | 359/110 |
| 5,521,902 | 5/1996 | Ferguson | 370/248 |
| 5,636,203 | 6/1997 | Shah | 370/244 |
| 5,644,617 | 7/1997 | Schmidt | 379/5 |

*Primary Examiner*—Seema S. Rao
*Assistant Examiner*—Saba Tsegaye

[57] ABSTRACT

In switching centers serving multiple local access providers, a problem arises in detecting cable failure and identifying the provider of the failed cable connected between the switching center and remote terminals. A test circuit installed in each cable port of the switching center detects failed cables; identifies the operator of the failed cable, and designates the cable end at which the failure occurs. The test circuit includes a signal detector and a signal generator and monitor connected through a switching device to the cables. A data signal Ds is transmitted on the cables. When the detector recognizes a loss of a data signal Ds exceeding a threshold a failed cable has occurred at one end of the cable or the other. The switch is activated by the signal loss to connect the signal generator and monitor to determine at which cable end the cable has failed. A reference signal Rs is injected into a cable by the signal generator and monitor. If the data signal Ds on the failed cable matches the reference signal Rs in amplitude and phase, a cable failure is indicated at the near end of the cable detector. If the data signal Ds is degraded in amplitude and shifted in phase relative to the reference signal Rs, a cable failure is indicated at the far end of the cable.

17 Claims, 4 Drawing Sheets

FEND= FAR END
NEND= NEAR END

NEAR END FAILURE
(PEAK LEVEL MATCHES GENERATOR)

FAR END FAILURE
(PEAK LEVEL LESS THAN GENERATOR)

METHODS AND APPARATUS FOR DETECTING AND LOCATING CABLE FAILURE IN COMMUNICATION SYSTEMS

BACKGROUND OF THE INVENTION

1. Field of the Invention

This invention relates to methods and apparatus for cable testing in communication systems. More particularly, the invention relates to methods and apparatus for detecting a failed cable end and operator of the cable connected between remote switching centers in communications systems.

2. Description of the Prior Art

Today's communications systems include transmission paths, for example, T3 lines linked together by network switching centers serving multiple-access providers. In many instances, a network switching failure can be attributed to a bad or disconnected T3 cable interconnecting remote switching centers. One problem with such a failure is detecting and identifying the cable end at which the failure has occurred. Another problem is determining the access provider responsible for the failed cable and restoring service to the switching center.

Prior art related to detecting and identifying faults in cables connected to remote switching centers includes the following:

U.S. Pat. No. 4,413,229 issued Nov. 1, 1983, discloses a method for locating faults or failures in RF coaxial cable TV transmission facilities. A fault locator signal frequency is inserted into the cable system and low magnitude signals are emitted by means of a bandpass filter and radiating element. The radiated RF is detected to determine coaxial cable system operation. Bandpass filters and radiating elements are located at each point to be tested. Intentional, controlled, discriminate RF radiation is used for fault detection in conjunction with a coupler bandpass filter.

U.S. Pat. No. 4,524,321 issued Jun. 18, 1985, discloses a method of detecting open-wire or improper wire connections in a group of wires interconnecting first terminals of a first bank with second terminals of a second bank. Integrity and connection of the cable wires are checked for shorts of the wires to ground, to battery wiring between each other, and for opens and mis-connections or cross-connections of the wires. Recognition circuits control, analyze, and display test results to apprise an operator(s) stationed at either or both ends of the cable.

U.S. Pat. No. 5,282,237 discloses a ring communications network having a plurality of line concentrators each including a ring-in port, a ring-out port, and a plurality of station ports. The network is adapted to detect a fault in a trunk cable between concentrators and re-configure the ring to bypass that fault. Fault detection is accomplished by injecting a phantom DC voltage at the ring-out port and sensing whether current due to that voltage is present at both the ring-out port and the ring-in port of the next adjacent concentrator in the ring.

None of the prior art discloses methods and apparatus for detecting and locating which end of a cable connected between remote terminals has failed and the identity of the service provider of the failed cable.

SUMMARY OF THE INVENTION

In a communications system including plural network switching center, transmission links, for example, T3 lines, in the form of cables, are located in ports in the network switching centers. A test circuit is installed in each port to detect and locate a failed cable and the cable end at which the failure has occurred. The test circuit includes a signal detector and a signal generator and monitor device connected to the cable through a switching device. When the signal detector recognizes a loss of a data signal Ds exceeding a threshold indicative of a failed cable, the test circuit is activated for the port. The switch is activated by the signal detector to connect the signal generator and monitor to the failed cable. A T3 rate test signal of the order of $45 \times 10^6$ bits/second is injected into the cable by the signal generator and monitor as a reference signal Rs. If the data signal Ds detected by the signal generator and monitor is degraded from the reference signal Rs, a cable failure has occurred in the switching center at the far or remote end of the cable connected to the port. If the data signal Ds detected by the signal generator and monitor matches the reference signal Rs, a cable failure has occurred at the near end or at the cable port in the switching center. Having identified the failed cable and the switching center in which the failed cable end is located, an operator for the service provider responsible for the failed cable can take steps to correct the failed condition and restore the failed cable to operation in the network switching center.

DESCRIPTION OF PREFERRED EMBODIMENT

Figure 1:
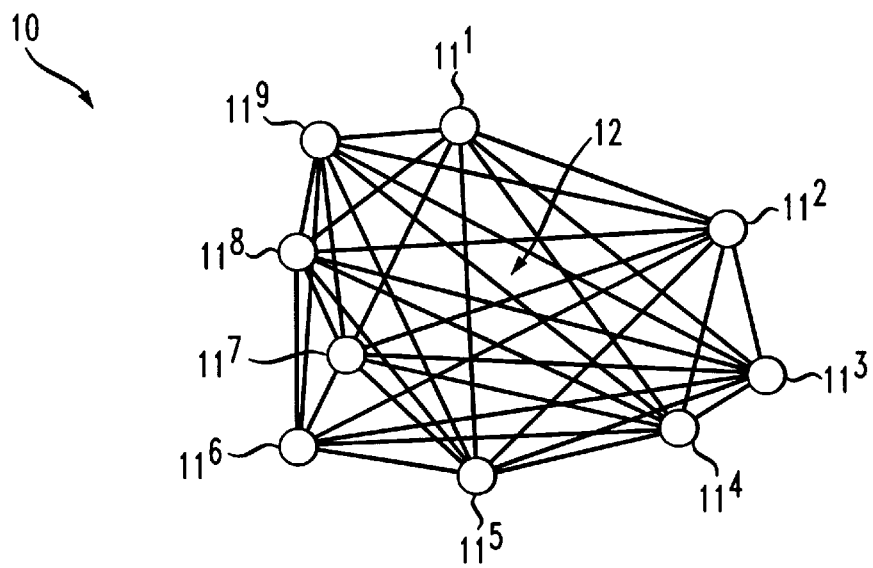
FIG. 1 is a circuit diagram of a communications system in the prior art including transmission links interconnected by network switching centers.

In FIG. 1 a prior art communication system 10 is shown including network switching centers 11 interconnected to other switching centers through transmission links 12. In one form, the network switches may be part of a Digital Access and Cross-Connect System (DACS). A DACS is a digital switching device for routing and switching T3 lines and Digital Signal, (DS3) portions of lines among multiple T-3 ports. The system performs all the functions of a normal switch, except that connections are typically set up in advance of the call, not together with the call as in most normal low band communication systems, for example, voice band and data. The DAC is a specialized type of high speed data channel switch.

The transmission lines 12 are typically of a T3 type which contain 28 T1 channels and are commonly referred to as a 45 megabit per second line capable of handling 672 voice conversations.

Figure 2:
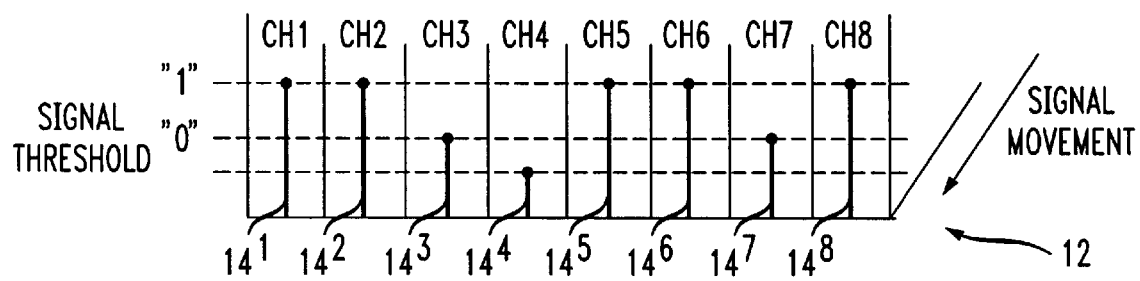
FIG. 2 is a representation of channels in a T3 line carrying signals, one channel of which has incurred a signal loss.

In FIG. 2 a portion of a transmission line 12 is shown containing channel 1 . . . , channel n, in which pulse-code modulated signals 14 are transmitted, for example, from one switching center $11^1$ to another switching center $11^4$. The pulse-code modulated signals are represented by a "0" level and a "1" level. Pulse-code modulated transmission systems are well known in which a voice signal is sampled and the analog value of the sample is converted into a serial-digital code typically comprising 8 bits. The value of the analog signal is represented by the combination of "1's" and "0's" in the 8-bit code for the channel. FIG. 2 only shows one of the binary bits in the serial code in each channel.

The transmission lines are connected to each switching center 11 through a port (not shown) which is the physical or electrical interface through which the binary signals 14 on the transmission lines 12 gain access to the switching center.

Figure 3:
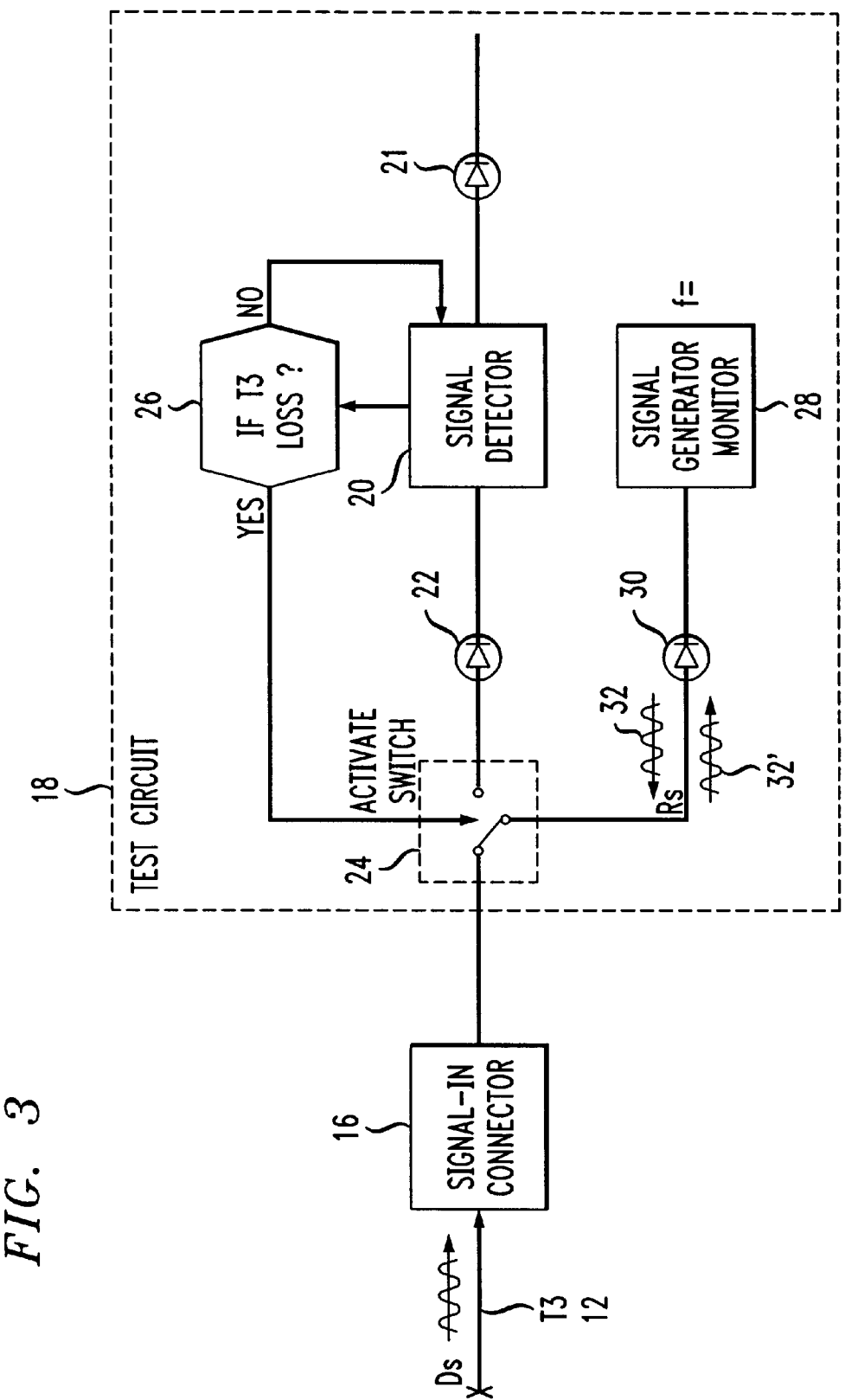
FIG. 3 is a circuit diagram of a test circuit incorporating the principles of the present invention and showing a cable fault detecting and locating system installed in a cable port of a network switching center.

In FIG. 3, a T3 line 12 carrying a digital input signal Ds is connected to a network switching center through a signal-in connector 16. To detect and locate failed channels from signal loss in the T3 line 12, a test circuit 18 is connected to the connector 16. The test circuit includes a signal detector 20 for receiving the input signal DS through a switch 24 and an isolating diode 22 and serves as the front end of the DACS. The other side of the detector 20 is connected to the DACS (not shown) through an isolating diode 21. A logic circuit 26 is coupled to the detector 20 and monitors the T3 signal level (Ds) for signal loss in accordance with a signal threshold described, for example, in ATT Data Communications Technical Reference, Section 9.4.1 related to high capacity digital service, published June 1989 and represented by 175 plus or minus 75 consecutive 0's (B3ZS). Obviously, other standards may be used for determining signal loss on the T3 channel. When the logic circuit determines a signal loss has occurred in the Ds signal level on the T3 line, a failed cable has been detected. Accordingly, the switch 24 is activated by the logic circuit 26 to switch the failed T3 line from the signal detector 20 to a signal generator and monitor circuit 28 through an isolating diode 30. The circuit 28 transmits a reference signal Rs in the form of a pulse train 32 for comparison with the data signal Ds on the failed T3 line to determine which end of the T3 line has failed, as will be described in conjunction with FIGS. 4 and 5A/B.

Figure 4:
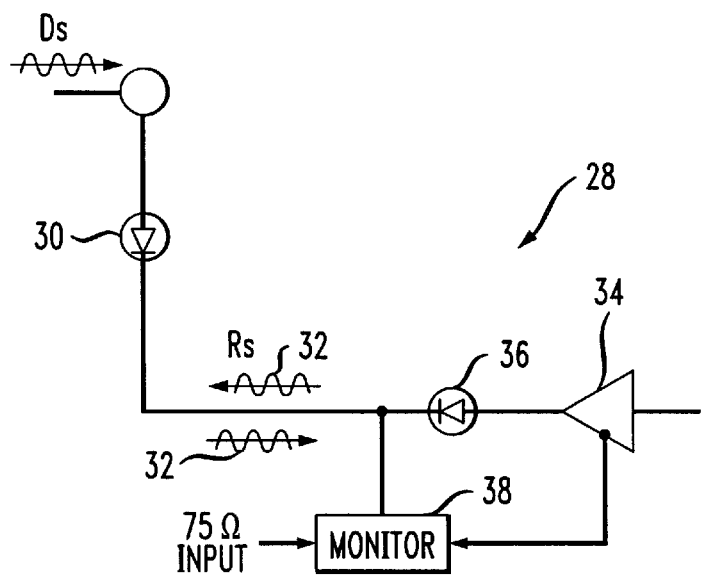
FIG. 4 is a circuit diagram of a signal generator and monitor included in the circuit of FIG. 3 for generating a reference signal Rs for comparison with a data signal Ds on a failed cable.

In FIG. 4, a pulse generator 34 is coupled to the failed T3 line through an isolating diode 36. The generator supplies a bipolar signal 32 as a reference signal Rs to the failed T3 line in the form of a train of binary 1's at the T3 rate of $45 \times 10^6$ bits/sec at a digital signal level (DSX) of 1 volt. A data signal Ds on the failed line is received by a monitor 38. A 75 ohm input and a reference level from the generator 34 enable the data signal to be received as a clean signal if the failed line occurs at the near end of test circuit and a degraded signal if the cable failure occurs at the far end thereof. The monitor 38 measures the average peak-to-peak voltage of the Ds and Rs signal for comparison purposes as an indicator of which terminating end of the T3 line or cable has failed.

Figure 5A:
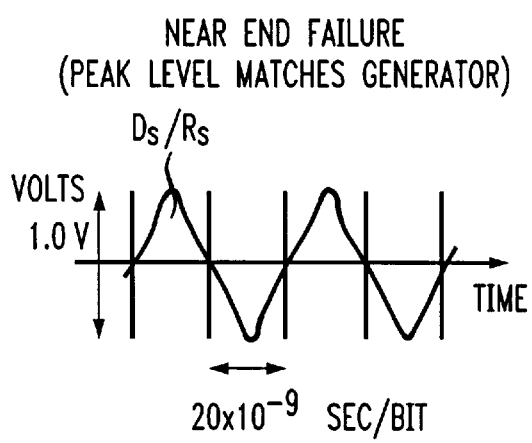
FIG. 5A is an oscilloscope screen showing a data signal (Ds) matching a reference signal (Rs) generated by the signal generator and monitor of FIG. 4 and indicative of a cable failure at the near end of a failed cable connected to the test circuit.
Figure 5B:
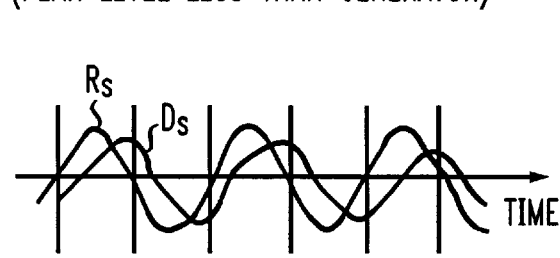
FIG. 5B is an oscilloscope screen showing the data signal Ds degraded from the reference signal Rs and indicative of a cable failure at the far end of a failed cable connected to the test circuit.

In FIG. 5A, in one form, an oscilloscope or any impedance measuring device (not shown) connected to the detector 38 shows the Ds pulse trains matches the Rs pulse train in amplitude and phase and, as such, is indicative of a cable failure at the test circuit or near end of the cable. Stated another way, the monitor 38 displays a clean Ds signal which sees a 75 ohm termination and as such is in phase and amplitude with the T3 pulse train transmitted by the generator 34.

In FIG. 5A, the oscilloscope shows the Ds signal is shifted in phase and degraded in amplitude from Rs the reference signal due to the cable not being attached to a switching center at the cable far end. Stated another way, the monitor 38 displays a degraded Ds relative to Rs due to the cable failure at the far end. Knowing the identity of the failed cable and channel, the service provider having responsibility for that cable can be identified and prompted to restore service to the channel.

Figure 6:
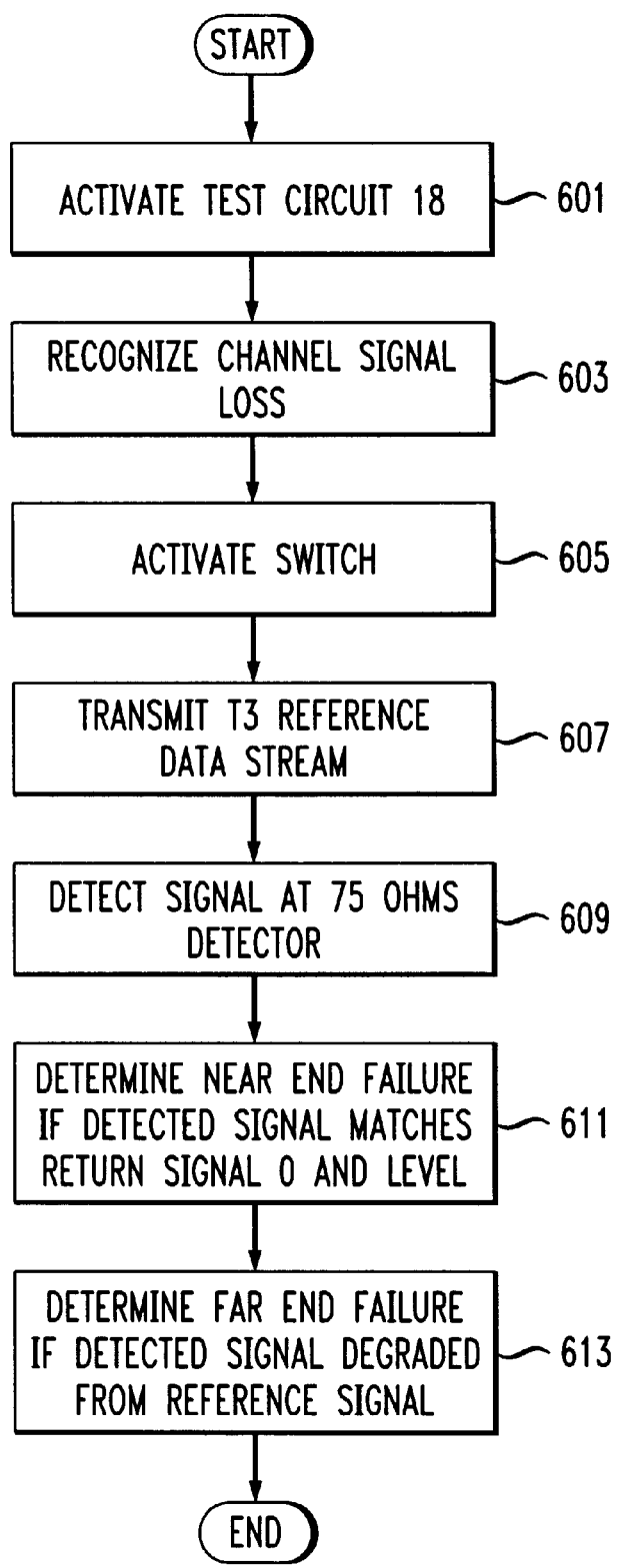
FIG. 6 is a flow diagram implementing the operation of the circuit in FIGS. 3–5A/B.

In FIG. 6, the process of operating the test circuit 18 begins in an operation 601 which activates the test circuit 18. The test circuit recognizes a channel signal loss in an operation 603 when the channel signal level is reduced below a threshold as represented by a standard. The logic circuit 26 activates the switch 24 in an operation 605 which disconnects the transmission line 12 from the signal detector and connects it to a signal generator and monitor circuit 28. The circuit 28 in an operation 607 transmits a reference pulse stream Rs to the failed cable at a T3 pulse rate of the order of $45 \times 10^6$ bit/sec. using the pulse generator 34. An operation 609 detects a data stream Ds transmitted on the failed cable and the reference signal Rs on the failed cable for display on an oscilloscope or other impedance measuring device. A near end cable failure is detected in an operation 611 when the oscilloscope displays the data signal Ds and reference signal Rs as being matched in amplitude and phase as received by the monitor 38 and displayed on the oscilloscope. In such instance, a failed cable sending a clean T3 pulse train when it is known the cable has failed indicates the cable failure has occurred at the near end of the cable where the test circuit is located. A far end cable failure is detected in an operation 613 when the oscilloscope displays the data signal Ds as being degraded and shifted in phase relative to the reference signal Rs as received by the monitor 38. In such an instance, the failed cable indicates the cable is not connected at the far end and the data signal Ds has become degraded relative to the reference signal Rs. After a near or far end determination has been made, the circuit 18 returns to its initial transmission loss detection state until transmission signal loss is again detected whereupon the process is repeated.

Summarizing, the present invention provides a test circuit K connected to a cable port in a network switching center. The circuit monitors the signal level of the channels in a cable connected at one end to a remote or far end switching center and to a local switching center at the near or other end of the cable. When a signal level in a cable channel falls below a threshold, a failed cable is detected and a signal generator and monitor circuit is activated to transmit a T3 pulse train to the failed channel as a reference signal Rs. The Rs pulse train is compared in the monitor to a data signal pulse train Ds carried on the failed cable. A near end cable failure is indicated when the Ds and Rs pulse trains are matched in amplitude and phase as displayed in or on an impedance sensing device, such as an oscilloscope. A far end cable failure is indicated when the Ds pulse train is degraded in amplitude and shifted in phase relative to the reference signal Rs as displayed on an oscilloscope. The failure information can be used to identify and alert a service provider to repair the failed cable.

While the invention has been described with respect to a specific embodiment, various changes can be made in the embodiment with departing from the spirit and scope of the invention as defined in the appended claims in which:

I claim:

1. In a switching center serving multiple local access providers of cables connected between the switching center and remote terminals, apparatus for detecting and identifying a cable end and local access provider of a failed cable connected between the switching center and the remote terminals, comprising:
- a) means for operating each cable at a desired signal for a data signal Ds;
- b) a signal detector and a signal generator and monitor connected through a switching device at one end of a cable for test purposes;
- c) means included in the signal detector for recognizing a loss of signal level exceeding a threshold indicative of a cable failure and operating the switching device to connect the signal generator and monitor to the failed cable;
- d) means, in the signal generator for generating and transmitting a test train as a reference signal Rs to the failed cable; and
- e) means, in the monitor for comparing in amplitude and phase the Ds and Rs signals on the failed cable to determine (i) if the cable failure occurred at the remote terminal or far end, or (ii) the switching center or near end of the cable, and (iii) the local access provider operating the failed cable.

2. The apparatus of claim 1 further comprising:
- a) logic means connected to the signal detector for activating the switching means when a signal loss indicative of a failure has occurred on a cable.

3. The apparatus of claim 1 further comprising:
- a) a monitor for receiving the data signal Ds and determining the cable end at which the cable failure has occurred.

4. The apparatus of claim 3 further comprising:
- a) means for connecting the monitor to a reference impedance source.

5. The apparatus of claim 1 wherein the comparison indicates a cable failure has occurred at the near end of the failed cable when the test signal Rs and the data signal Ds are matched in amplitude and phase.

6. The apparatus of claim 1 wherein the comparison indicates a cable failure has occurred at the far end of the cable when the data signal Ds is degraded in amplitude and phase with respect to the reference signal Rs.

7. The apparatus of claim 1 wherein the test signal is a pulse train at a bit rate/second corresponding to the bit rate/second for the failed cable.

8. The apparatus of claim 1 wherein each cable is of a T-3 type and the switching center is part of a digital access cross connect system.

9. The apparatus of claim 2 wherein the switch normally connects the cable to the signal detector until activated by the logic means whereupon the switch connects the signal generator and monitor to the cable.

10. In a switching center, a test circuit including a signal detector and a signal generator and monitor connected through a switching device to cables interconnecting the switching center and remote terminals, a method for detecting which cable end has failed and a local access provider operating the failed cable, comprising the steps of:
- a) transmitting a data signal Ds at a desired signal level on the cables;
- b) recognizing a loss of the desired signal level on the cables exceeding a threshold as indicative of a failed cable;
- c) operating the switching device to connect the signal generator and monitor to the failed cable when the threshold is exceeded;
- d) generating and transmitting a reference signal Rs to the failed cable: and
- e) comparing in amplitude and phase the Ds and Rs signals on the failed cable to determine (i) if the cable failure occurred at the remote terminal or far end, or (ii) the switching center or near end of the failed cable, and (iii) the local access provider operating the failed cable.

11. The method of claim 10 wherein the step of comparing further comprises the step of:
- a) comparing the data signal Ds and the reference signal Rs in amplitude and phase, one comparison being indicative of a cable failure occurring at the near end and another comparison being indicative of a cable failure at the far end of the cable for identifying the local access provider operating the failed cable.

12. The method of claim 10 wherein the step of comparing further comprises the step of:
- a) identifying a far end cable failure when the data signal Ds is degraded in amplitude and phase with respect to the reference signal Rs.

13. The method of claim 10 wherein the step of comparing comprises the step of:
- a) identifying the near end cable failure when the data signal Ds and the reference signal Rs are matched in amplitude and phase.

14. Apparatus for detecting and identifying a cable end and local access provider of a failed connection between a switching center and a remote terminal comprising:
- a.) means for operating a cable between the switching center and a remote terminal at a desired signal level for a data signal Ds having amplitude and phase;
- b.) a signal detector and a signal generator and monitor connected to one end of the cable through a switching device;
- c) means included in the signal detector for recognizing the loss of signal level exceeding the threshold indicative of a cable failure;
- d) logic means connected to the signal detector for activating the switching device when a signal loss indicative of a failure has occurred on the cable; the switching device normally connecting the cable to the signal detector until activated by the logic means whereupon the switching device connects the signal generator and monitor to the failed cable;
- e) means, in the signal generator for generating or transmitting a test signal as a reference signal Rs and having amplitude in phase to the failed cable; and
- f) means, in the monitor, for comparing amplitudes and phase of the Ds and Rs to determine (i) if the cable failure occurred in the remote terminal or far end, or (ii) the switching center or a near end of the cable, and (iii) the local access provider operating the failed cable.

15. The apparatus of claim 14 further comprising:
- a) means for determining whether the Ds signal is shifted in phase and degraded in amplitude from Rs the reference signal due to a far end cable failure.

16. The apparatus of claim 14 further comprising:
- a) means for comparing the amplitude and phase of a Ds and Rs signals to determine whether the amplitudes and phases of the Ds and Rs signals are matched in phase and amplitude as indicative of a cable failure at the near end of the cable.

17. In a switching center, a test circuit including a signal detector and a signal generator and monitor connected through a switching device to cables interconnecting the switching center and remote terminals, a method for detecting which cable end has failed and a local access provider operating the failed cable, comprising the steps of:

a) activating the test circuit to determine whether an interconnecting cable has failed;
b) recognizing a signal loss in a data signal Ds having amplitude and phase in an interconnecting cable as indicative of a failed cable at one of the cable for test purposes;
c) activating the switching device to connect the failed cable to the signal generator and monitor;
d) transmitting a reference signal Rs having amplitude and phase to the monitor from the signal generator; and
e) comparing the amplitudes and phases of the Ds and Rs signals at the monitor to determine whether the failed d cable has occurred at the switching center or at the remote terminal and the local access provider of the failed cable.

* * * * *